May 7, 1963   L. R. HEIM   3,088,190
METHOD FOR MAKING ANTIFRICTION BEARINGS
Filed July 3, 1959
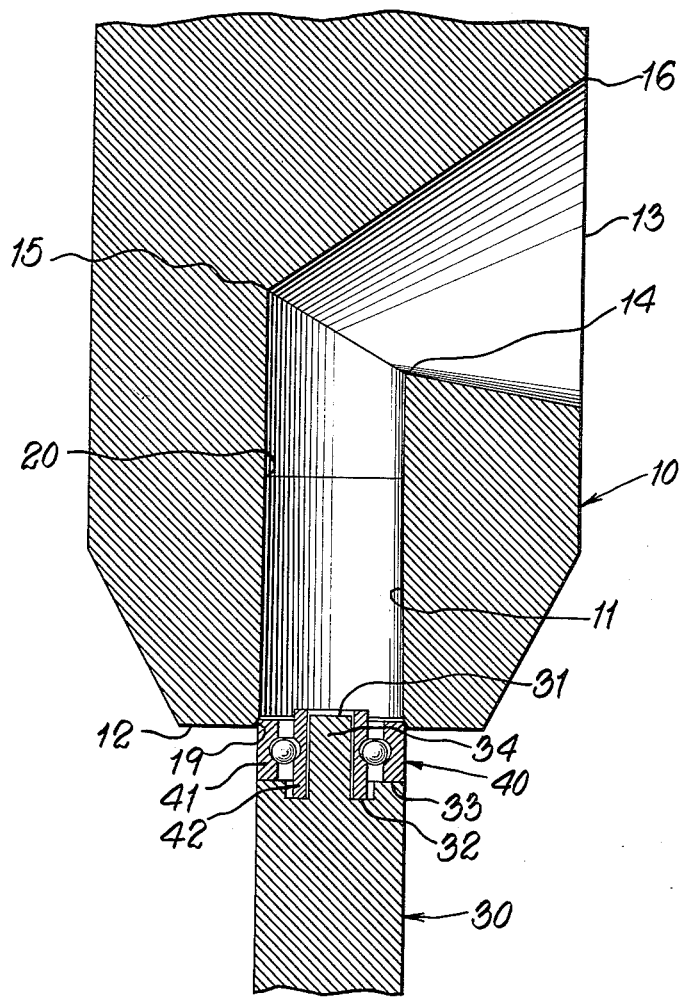
INVENTOR.
LEWIS R. HEIM
BY Davis, Hoxie, Faithfull
& Hapgood
ATTORNEYS United States Patent Office 3,088,190
Patented May 7, 1963

3,088,190
METHOD FOR MAKING ANTIFRICTION
BEARINGS
Lewis R. Heim, Fairfield, Conn.
Filed July 3, 1959, Ser. No. 824,831
15 Claims. (Cl. 29—148.4)

My invention relates to antifriction bearings, more particularly to bearings having two ring-like members in telescoped relation with rolling elements between them.

For many years manufacturers in the antifriction bearing field have sought a method of making bearings of this type with both ring-like members unbroken and with a full complement of rolling elements between them. In my United States Patent No. 2,910,765, issued on November 3, 1959, a continuation of my abandoned United States patent application Serial No. 499,688, filed April 6, 1955, I have shown that such bearings can be made by diminishing the space between the members by plastically deforming one of them while it is in a ductile state and then heat treating it, and I have described in detail apparatus and a process for performing this operation. In this application, which is a continuation-in-part of Patent No. 2,910,765, I describe preferred embodiments of additional apparatus and an additional method for performing it which in certain circumstances are preferable to those described in the earlier application.

The single drawing shows a section view of the apparatus. It includes a swaging die 10, capable of being attached to a ram of a hydraulic press (not shown), and a circular stationary platform 30. The platform 30 has a bearing 40, loosely assembly, resting on it. The bearing 40 has an outer member 41, of ductile hardenable material such as heat-treatable steel, and an inner member 42, with balls between the members. The die 10 has a hollow tubular passage 11 extending upward from the bottom wall 12 and then outward to the side wall 13. The passage 11 extends upward to points 14 and 15 before branching outward to the wall 13, and its ceiling slopes upward from 15 to 16 as it branches outward. It is circular in cross-section from the bottom wall 12 to 14. At the bottom wall 12 it is approximately equal in diameter to the diameter of the outer member 41, which is to be contracted radially, and it has a chamfer 19. As it rises from the bottom wall 12 it decreases in diameter until reaches a point 20 where it is equal in diameter to the outer diameter desired for the outer member after contraction. The diameter at the point 20 can be determined as described below.

The top of the circular platform 30 in this example has three levels bounded by concentric circles. The innermost level 31 is highest, the next level outward 32 is lowest and the outermost level 33 is of intermediate height. The dimensions of the platform are such that the bearing 40 can rest on it with the topmost part of the platform acting as a pin 34 over which the inner member of the bearing fits loosely. The next outward portion supports the inner member, and the outermost portion supports the outer member. The members and balls are preferably sufficiently close together that the balls cannot fall below the races of the members. This relation between members and balls can be achieved by the use of members proportioned so that the space between the cylindrical parts of the walls is less than the diameter of the balls but sufficient to permit assembly, as described in my United States Patent No. 2,910,765 referred to above, that is, by loading the balls in a race of one of the members and then bringing the members into the relation shown in the drawing herein. When the bearing 40 rests on the platform 30 the race of the inner member is preferably slightly below the race of the outer member to permit floating of the inner member during the contraction step as described below.

In operation the bearing is placed on the platform as shown and the die 10 descends until the tubular passage 11 has passed over the member and the point 14 is just below the bearing. During the descent of the portion of the passage from the chamfer 19 to the point 20 the outer member is caused to contract until the inner and outer members and the balls between them are in bearing relation. The die is then raised, another bearing 40 is placed on the platform, and the operation is repeated on that bearing. It should be noted that as the outer member 41 begins to contract it forces the balls inward against the upper shoulder of the race of the inner member 42 thereby raising the inner member from its position on the platform 30 to a point where the races of the inner and outer members are aligned. Thus the inner member 42 is free to "float" within the limits imposed by the pin 34, throughout the contracting step. It is preferable to provide substantial floating to insure a proper fit in the finished product.

The operation described above will result in a finished bearing with unbroken members and a full complement of rolling elements. Any desired degree of fit may be obtained by varying the diameter of the passage 11 at the point 20. However, in some circumstances an alternative operation is desirable, that is, a combination of contraction of the outer member and expansion of the inner member. In that case, of course, the dimensions of the tubular portion 11 are such that the step of contracting the outer member alone is insufficient to bring it and the balls into final bearing relation. This alternative has the advantage that the space between the members can be greater at the beginning than would be possible if that space had to be diminished by one operation alone.

Although it is feasible in this alternative to expand the inner member either before or after contracting the outer member it is usually preferable for optimum control of dimensions to contract the outer member first and then to bring the parts into final bearing relation by expanding the inner member. It has been my experience that greater control of dimensions can be achieved in the expansion step than in the contraction step and that especially in small bearings unexpectedly beneficial dimensional control can be obtained by diminishing the space mostly by contraction and only slightly by expansion.

If desired, the step which brings the parts into final bearing relation can be carried out until the members and the balls are in preloaded condition, that is, forced against each other radially, after which the races may be burnished by the method of burnishing described in my United States Patent No. 2,913,810, issued on November 24, 1959, or by the method described in my United States patent application Serial No. 820,635, filed June 16, 1959. Here again, I have found it preferable to carry out the expansion step later than the contraction step and to a lesser degree of deformation than the contraction step in order to achieve greater control of dimensions. The members may also be heat treated as described in my United States Patent No. 2,910,765, referred to above, after the space-diminishing step, or after the burnshing step if one is employed, in order to harden one or both of them.

I claim:

1. A method of making antifriction bearings comprising forming an outer bearing member of unhardened material with a circular opening through it and a raceway in the wall of the opening; forming an inner bearing member with a circular outer wall and a second raceway in the outer wall, the outer wall having a diameter sufficiently small to permit the placing of rolling elements in one of the raceways and then placing the inner member in the opening with raceways and rolling elements aligned; placing rolling elements in one of the raceways; then placing the inner member in the opening with the raceways and rolling elements aligned; and then radially contracting the unhardened outer bearing member sufficiently to interlock the inner and outer members through the rolling elements said contraction being of substantially plastic nature.

2. A method as set forth in claim 1 in which the contraction step is continued until members and elements are preloaded and then one of the members is rotated relative to the other to burnish the members whereby surface irregularities in the raceways are reduced.

3. A method as set forth in claim 1 in which the inner and outer members are placed on a platform prior to contraction of the outer member with the raceways partially aligned but with the raceway of the inner member lower than the raceway of the outer member and in which the raceway of the inner member is raised by the force of the rolling elements on it during the contraction step.

4. A method of making antifriction bearings, comprising forming an outer bearing member of unhardened, hardenable material with a circular opening through it and a raceway in the wall of the opening, forming an inner bearing member with a circular outer wall and a second raceway in the outer wall, placing the inner and outer member in telescoped relation with rolling elements between them, diminishing the space between the inner and outer members by radially contracting the outer member sufficiently to interlock the inner and outer members through the rolling elements, said contraction being of substantially plastic nature, and then subjecting the interlocked members and elements to a step which hardens the outer member.

5. A method of making antifriction bearings comprising forming an outer bearing member of unhardened material with a circular opening through it and a raceway in the wall of the opening; forming an inner bearing member of unhardened material with a circular outer wall and a second raceway in the outer wall; placing the inner member in the opening with the raceways aligned and rolling elements between the members, and diminishing the space between the members by radially contracting the outer member and radially expanding the inner member sufficiently to interlock the inner and outer members through the rolling elements said contraction being of substantially plastic nature.

6. A method comprising carrying out the steps of claim 5 and then subjecting the interlocked members and elements to a step which hardens at least one of the members.

7. A method as set forth in claim 5 in which the outer member is contracted before the inner member is expanded.

8. A method as set forth in claim 5 in which most of the diminishing of space is done by contraction of the outer member.

9. A method as set for thin claim 5 in which the expansion step occurs later than the contraction step and with a lesser amount of deformation than the contraction step.

10. A method of making antifriction bearings comprising forming an outer member of unhardened material with a circular opening through it and a raceway in the wall of the opening; forming an inner bearing member of unhardened material with a circular outer wall and a second raceway in the outer wall; placing the inner member in the opening with the raceways aligned and rolling elements between the members; radially contracting the outer member, then radially expanding the inner member sufficiently to interlock the inner and outer members through the rolling elements, said contraction being of substantially plastic nature; and then subjecting one of the members to a step which hardens it.

11. A method as set forth in claim 10 in which the expansion step results in a lesser degree of deformation than the contraction step.

12. A method as set forth in claim 10 in which the expansion step is carried out until the members and elements are in preloaded condition.

13. A method as set forth in claim 10 in which the contraction step results in a greater amount of deformation than the expansion step and in which the expansion step is carried out until the members and elements are in preloaded condition.

14. A method of making antifriction bearings comprising forming an outer bearing member of unhardened, hardenable material with a circular opening through it and a raceway in the wall of the opening; forming an inner bearing member of unhardened, hardenable material with a circular outer wall and a second raceway in the outer wall; placing the inner member in the opening with the raceways aligned and rolling elements between the members, diminishing the space between the members by radially contracting the outer member and radially expanding the inner member so that the later-occurring space-diminishing step is sufficient to interlock the inner and outer member through the rolling elements and to force the members in a radial direction against the rolling elements, said contraction being of substantially plastic nature, and rotating one member with respect to the other to burnish the members whereby surface irregularities in the raceways are reduced.

15. A method of making antifriction bearings comprising forming an outer bearing member of unhardened hardenable material with a circular opening through it and a raceway in the wall of the opening; forming an inner bearing member with a circular outer wall and a second raceway in the outer wall, the outer wall having a diameter sufficiently small to permit the placing of rolling elements in one of the raceways and then placing the inner member in the opening with the raceways and rolling elements aligned; placing rolling elements in one of the raceways; then placing the inner member in the opening with the raceways and rolling elements aligned; then radially contracting the outer bearing member sufficiently to interlock the inner and outer members through the rolling elements, said contraction being of substantially plastic nature; and then subjecting the interlocked members and elements to a step which hardens the outer member.

References Cited in the file of this patent

UNITED STATES PATENTS

| | | |
|---|---|---|
| 1,080,169 | Reed | Dec. 2, 1913 |
| 1,146,272 | Neukirch | July 13, 1915 |
| 1,339,152 | Arnold | May 4, 1920 |
| 1,517,574 | Morrison | Dec. 2, 1924 |
| 1,597,340 | Best | Aug. 24, 1926 |
| 2,185,483 | Ward | Jan. 2, 1940 |
| 2,275,122 | Crans | Mar. 3, 1942 |
| 2,783,528 | Menne | Mar. 5, 1957 |
| 2,852,838 | Krutmeijer | Sept. 23, 1958 |
| 2,910,765 | Heim | Nov. 3, 1959 |
| 2,913,810 | Heim | Nov. 24, 1959 |

FOREIGN PATENTS

| | | |
|---|---|---|
| 924,924 | Germany | Mar. 10, 1955 |
| 617,991 | Great Britain | Feb. 15, 1949 |